United States Patent
Abe et al.

(10) Patent No.: US 9,005,513 B2
(45) Date of Patent: Apr. 14, 2015

(54) LAYERED-MODELING METHOD FOR MANUFACTURING THREE-DIMENSIONAL OBJECT

(75) Inventors: Satoshi Abe, Osaka (JP); Norio Yoshida, Nara (JP); Yoshikazu Higashi, Shiga (JP); Isao Fuwa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 699 days.

(21) Appl. No.: 13/319,622

(22) PCT Filed: May 14, 2010

(86) PCT No.: PCT/JP2010/058175
§ 371 (c)(1),
(2), (4) Date: Feb. 3, 2012

(87) PCT Pub. No.: WO2010/131734
PCT Pub. Date: Nov. 18, 2010

(65) Prior Publication Data
US 2012/0126457 A1    May 24, 2012

(30) Foreign Application Priority Data

May 15, 2009 (JP) ............................. P2009-119021

(51) Int. Cl.
 B29C 35/08 (2006.01)
 B29C 67/00 (2006.01)
 B22F 3/105 (2006.01)
(52) U.S. Cl.
 CPC ........... *B29C 67/0077* (2013.01); *B22F 3/1055* (2013.01); *B22F 2999/00* (2013.01); *B29C 67/0085* (2013.01); *B22F 2003/1056* (2013.01)
(58) Field of Classification Search
 CPC .................... B29C 67/0051; B29C 67/0077
 USPC .............. 264/39, 85, 460, 461, 462, 463, 497
 See application file for complete search history.

(56) References Cited

U.S. PATENT DOCUMENTS

| 5,106,288 A * | 4/1992 | Hughes ...................... 425/174.4 |
| 2009/0020920 A1 * | 1/2009 | Kumagai et al. .............. 264/401 |

(Continued)

FOREIGN PATENT DOCUMENTS

| JP | 2006-124732 | 5/2006 |
| JP | 2009-7669 | 1/2009 |
| WO | 2008/146920 | 12/2008 |

OTHER PUBLICATIONS

Search report from E.P.O., mail date is Oct. 23, 2012.

(Continued)

*Primary Examiner* — Leo B Tentoni
(74) *Attorney, Agent, or Firm* — Greenblum & Bernstein P.L.C.

(57) ABSTRACT

An object of the present invention is to easily eliminate fumes inside a chamber, so as to improve a positional accuracy of irradiation with a light beam and a machining accuracy in a method for manufacturing a three-dimensional shaped object. A stacked-layers forming device 1 includes a powder layer forming unit 3, a light beam irradiating unit 4, a base 22 which is fixed and on which a powder layer 32 is formed, a lifting/lowering frame 34 which surrounds the circumference of the base 22 and is freely capable of being lifted and lowered, a cover frame 36 which has a window 36a allowing transmission of light beam in its top surface, and whose bottom surface is opened, and which is disposed on the lifting/lowering frame 34 to form a chamber C, and a gas tank 71 for supplying an ambient gas. The lifting/lowering frame 34 is lowered to reduce the volume of the chamber C, so as to discharge fumes generated inside the cover frame 36, which performs replacement with the ambient gas. Since the volume of the chamber C is reduced, it is possible to easily eliminate the fumes, which makes it possible to improve the positional accuracy of irradiation with the light beam L, and the machining accuracy.

12 Claims, 7 Drawing Sheets

(56) References Cited

U.S. PATENT DOCUMENTS

2010/0006228 A1 1/2010 Abe et al.
2011/0109016 A1 5/2011 Fuwa et al.
2012/0041586 A1 2/2012 Abe et al.

OTHER PUBLICATIONS

International Preliminary Report on Patentability for PCT/JP2010/058175, mailed Nov. 15, 2011 and English language translation thereof.
U.S. Appl. No. 13/378,475, filed Dec. 15, 2011, Satoshi Abe et al.

* cited by examiner

[Fig.6]
(a)
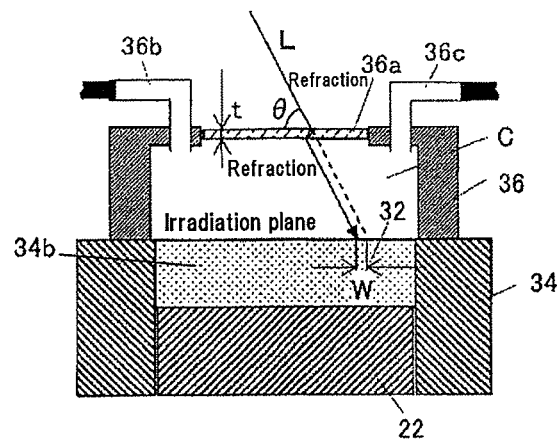
(b)
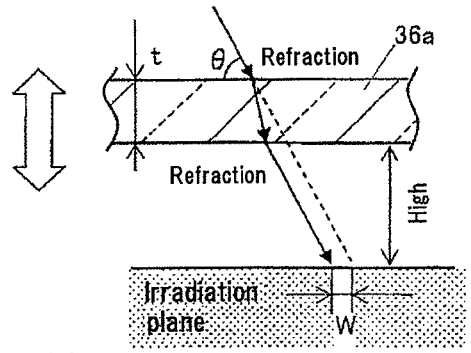
(c)
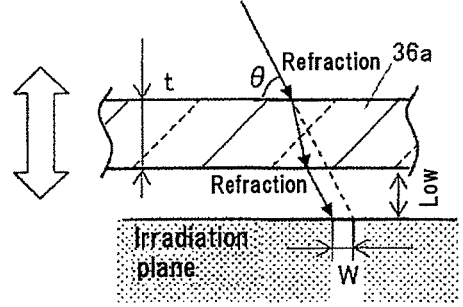

LAYERED-MODELING METHOD FOR MANUFACTURING THREE-DIMENSIONAL OBJECT

TECHNICAL FIELD

The present invention relates to a stacked-layers forming device that irradiates an inorganic or organic powder material with a light beam, and a method for manufacturing a three-dimensional shaped object.

BACKGROUND OF THE INVENTION

Heretofore, a method for manufacturing a three-dimensional shaped object by repeating forming a solidified layer by irradiating a powder layer formed of a powder material with a light beam, thereby allowing sintering or melting and subsequent solidification thereof to form a solidified layer, and then forming another solidified layer by newly forming a powder layer on the solidified layer, followed by irradiating the powder layer with the light beam, has been known.

In such a manufacturing method, there has been known a method using a forming device which comprises: a base which is fixed in order to improve an accuracy of machining a shaped object; a lifting/lowering frame which surrounds a circumference of the base and is freely capable of being lifted and lowered; a cover frame which has a window allowing transmission of light beam on its top surface, and whose bottom surface is opened, and which forms a chamber covering the powder layer by disposing it on the lifting/lowering frame (see Patent Document 1). In such a manufacturing method, a shaped object is formed by forming a powder layer and subsequently forming a solidified layer on a base, and repeating lifting up the lifting/lowering frame and stacking of solidified layers. In this way, the base on which the shaped object is mounted is fixed so as not to move, and as a result, the machining accuracy is improved.

However, in such a manufacturing method, the chamber is easily filled with fumes generated during sintering or melting and subsequent solidification, and fumes easily adhere to a window. An ambient gas is continued to be supplied into the chamber. However, it takes time to replace the fumes with the ambient gas, and a light beam scatters due to the filled fumes or the fumes adhering to the window, which has brought about the problem of decreased output and decreased degree of focusing of the light beam, and of deterioration in machining accuracy because of deterioration in positional accuracy of irradiation with the light beam. Further, there has been the problem that the light beam is absorbed into the fumes adhering to the window to raise a temperature of the window, which thermally deforms the window to further deteriorate the positional accuracy of irradiation.

Patent Document 1: JP-A-2009-7669

DISCLOSURE OF THE INVENTION

Problems to be Solved by the Invention

The present invention has been achieved in order to solve the aforementioned problems, and an object of the present invention is to provide a method for manufacturing a three-dimensional shaped object, which is capable of easily eliminating fumes inside the chamber, so as to improve the positional accuracy of irradiation with the light beam and the machining accuracy.

Means for Solving the Problem

In order to achieve the aforementioned object, the present invention provides a stacked-layers forming device for manufacturing a three-dimensional shaped object by forming a powder layer, and subsequently forming a solidified layer by irradiating the powder layer with a light beam in a chamber, the device comprising: a base; a lifting/lowering frame having a penetrating space, the penetrating space being communicated from one side to the other side and accommodating the base from the one side, the lifting/lowering frame being freely capable of being lifted and lowered with respect to the base; a cover frame, the cover frame being disposed so as to cover the penetrating space on the lifting/lowering frame, and comprising a window allowing transmission of light beam in its top surface; an ambient gas supply means for supplying an ambient gas; a light beam irradiating unit, the light beam irradiating unit performing irradiation with a light beam via the window; and a control unit, the control unit controlling lifting and lowering of the lifting/lowering frame with respect to the base, wherein the chamber is constituted by a top surface of the base, an inner circumferential surface, specifying the penetrating space, of the lifting/lowering frame, and an inner surface of the cover frame, and the control unit reduces a volume of the chamber by lowering the lifting/lowering frame to discharge fumes generated inside the chamber, and increases the volume of the chamber by lifting the lifting/lowering frame to supply an ambient gas from the ambient gas supply means.

According to the above constitution, the lifting/lowering frame on which the cover frame is mounted is lowered with respect to the base to reduce the volume of the chamber. Therefore, replacement of the fumes with the ambient gas is immediately carried out, which makes it possible to easily eliminate the fumes, and it is possible to improve the positional accuracy of irradiation with the light beam, and the machining accuracy.

As used in this description, the term "base" substantially means a member or a portion serving as a foundation for a shaped object to be manufactured. Further, as used in this description, the term "fumes" means a fumy substance generated from the powder layer on which the light beam is irradiated and/or the solidified layer (for example, "metallic vapor caused by a metal powder material" or "resin vapor caused by a resin powder material") at the time of manufacturing the three-dimensional shaped object. Moreover, the term "powder layer" as used in this description means, for example, "metal powder layer made of a metal powder" or "resin powder layer made of a resin powder" and the like. Furthermore, the term "solidified layer" as used in this description substantially means "sintered layer" when the powder layer is a metal powder layer, while it substantially means "cured layer" when the powder layer is a resin powder layer.

According to another embodiment of the present invention, it is preferred that the stacked-layers forming device comprises an exhaust port and an air supply port, the exhaust port and the air supply port being communicated with the chamber.

According to the above constitution, the fumes are discharged from the exhaust port and the ambient gas is supplied from the air supply port. Therefore, replacement of the fumes with the ambient gas is immediately carried out, which makes it possible to easily eliminate the fumes, and it is possible to improve the positional accuracy of irradiation with the light beam, and the machining accuracy.

According to yet another embodiment of the present invention, in the above-mentioned stacked-layers forming device, the discharge of the fumes and the supply of the ambient gas may be controlled on the basis of an amount of the fumes inside the chamber.

According to the above constitution, since the discharge of the fumes and the supply of the ambient gas are controlled on the basis of an amount of the fumes inside the cover frame, it is possible to accurately eliminate the fumes, and to improve the positional accuracy of irradiation with the light beam and the machining accuracy.

According to another embodiment of the present invention, in the above-mentioned stacked-layers forming device, the discharge of the fumes and the supply of the ambient gas may be carried out on the basis of a time from a start of irradiation with the light beam.

According to the above constitution, since the discharge of the fumes and the supply of the ambient gas are controlled on the basis of a time from the start of irradiation with the light beam, it is possible to improve the positional accuracy of irradiation with the light beam and the machining accuracy at low cost without installing a sensor or the like.

According to another embodiment of the present invention, in the above-mentioned stacked-layers forming device, a lowering speed and a lifting speed of the lifting/lowering frame and an amount of supplying the ambient gas during the discharge of the fumes and the supply of the ambient gas may be controlled on the basis of a pressure inside the chamber.

According to the above constitution, by controlling at least one of a lowering speed and a lifting speed of the lifting/lowering frame, and an amount of supplying the ambient gas in such a manner that the pressure inside the chamber becomes a predetermined value, it is likely that a flow of air inside the chamber is not made turbulent by a fluctuation in pressure inside the chamber. Accordingly, the powder material is prevented from scattering, which makes it possible to improve the positional accuracy of irradiation with the light beam and the machining accuracy. Further, when the pressure inside the chamber is extremely low, the atmosphere invades the chamber from the outside and the powder material is oxidized, to deteriorate a strength of the shaped object. However, in that case, such a behavior is prevented from occurring. The atmosphere is prevented from invading, which makes it possible to prevent deterioration of the strength of the shaped object.

According to yet another embodiment of the present invention, in the above-mentioned stacked-layers forming device, a lowering speed and a lifting speed of the lifting/lowering frame and an amount of supplying the ambient gas during the discharge of the fumes and the supply of the ambient gas may be controlled on the basis of an oxygen concentration inside the chamber.

According to the above constitution, since a lowering speed and a lifting speed of the lifting/lowering frame, and an amount of supplying the ambient gas are controlled on the basis of an oxygen concentration inside the chamber, it is possible to prevent the atmosphere from invading, which makes it possible to prevent deterioration of the strength of the shaped object caused by oxidation.

According to another embodiment of the present invention, in the above-mention stacked-layers forming device, the discharge of the fumes and the supply of the ambient gas may be carried out during the irradiation with the light beam.

According to the above constitution, since the irradiation with a light beam is carried out during the discharge of the fumes and the supply of the ambient gas, the irradiation with the light beam is not interrupted, which makes it possible to improve the production efficiency.

It is preferred that the stacked-layers forming device according to the present invention further comprises a shutter covering a bottom surface of the window.

According to the above constitution, since the shutter can cover the bottom surface of the window during the discharge of the fumes and the supply of the ambient gas, it is possible to prevent the scattering of the light beam caused by the powder material and the fumes adhering to the window, which makes it possible to improve the positional accuracy of irradiation with the light beam, and the machining accuracy.

The present invention provides a method for manufacturing a three-dimensional shaped object, the method producing a three-dimensional shaped object by using a stacked-layers forming device that successively stacks some solidified layers by repeating a powder layer forming step of supplying an inorganic or organic powder material to form a powder layer, and a solidified layer forming step of forming a solidified layer by irradiating the powder layer with a light beam, thereby allowing sintering or melting and subsequent solidification of the powder layer, wherein the stacked-layers forming device comprising: a powder layer forming means for executing the powder layer forming step; a light beam irradiating unit for irradiating the powder layer with the light beam; a base, the base being fixed and on a top surface side of the base the powder layer and the solidified layer being formed; a lifting/lowering frame, the lifting/lowering frame surrounding an outer circumference of the base and being freely capable of being lifted and lowered with respect to the base; a lifting/lowering drive means for lifting and lowering the lifting/lowering frame; a cover frame, the cover frame comprising a window allowing transmission of light beam in its top surface, and a bottom surface of the cover frame being opened, and the cover frame being disposed on the lifting/lowering frame to form a chamber; and an ambient gas supply means for supplying an ambient gas into the cover frame; wherein a volume of the chamber is reduced by lowering the lifting/lowering frame to discharge fumes generated inside the cover frame, and the volume of the chamber is increased by lifting the lifting/lowering frame to supply an ambient gas from the ambient gas supply means.

According to the above constitution, since the volume of the chamber is reduced by lowering the lifting/lowering frame on which the cover frame is mounted with respect to the base, a replacement of the fumes with the ambient gas is immediately carried out, which makes it possible to easily eliminate the fumes, and it is possible to improve the positional accuracy of irradiation with the light beam and the machining accuracy.

According to another embodiment of the present invention, in the above-mentioned method for manufacturing a three-dimensional shaped object, the discharge of the fumes and the supply of the ambient gas are carried out via an exhaust port and an air supply port, the exhaust port and the air supply port being provided in the cover frame.

According to the above constitution, since the fumes are discharged from the exhaust port and the ambient gas is supplied from the air supply port, a replacement of the fumes with the ambient gas is immediately carried out, which makes it possible to easily eliminate the fumes, and it is possible to improve the positional accuracy of irradiation with the light beam, and the machining accuracy.

According to another embodiment of the present invention, in the above-mentioned method for manufacturing a three-dimensional shaped object, the discharge of the fumes and the supply of the ambient gas are controlled on the basis of an amount of the fumes inside the chamber.

According to the above constitution, since the discharge of the fumes and the supply of the ambient gas are controlled on the basis of an amount of the fumes inside the cover frame, it is possible to accurately eliminate the fumes, and to improve the positional accuracy of irradiation with the light beam, and the machining accuracy.

According to another embodiment of the present invention, in the above-mentioned method for manufacturing a three-dimensional shaped object, it is preferred that the discharge of the fumes and the supply of the ambient gas are carried out on the basis of a time from a start of irradiation with the light beam.

According to the above constitution, since the discharge of the fumes and the supply of the ambient gas are controlled on the basis of a time from the start of irradiation with the light beam, it is possible to improve the positional accuracy of irradiation with the light beam and the machining accuracy at low cost without installing therein a sensor or the like.

According to one embodiment of the present invention, in the above-mentioned method for manufacturing a three-dimensional shaped object, a lowering speed and a lifting speed of the lifting/lowering frame and an amount of supplying the ambient gas during the discharge of the fumes and the supply of the ambient gas are controlled on the basis of a pressure inside the chamber.

According to the above constitution, by controlling a lowering speed and a lifting speed of the lifting/lowering frame, and an amount of supplying the ambient gas in such a manner that the pressure inside the chamber becomes a predetermined value, it is likely that a flow of air inside the chamber is not made turbulent by a fluctuation in pressure inside the chamber. Accordingly, the powder material is prevented from scattering, which makes it possible to improve the positional accuracy of irradiation with the light beam and the machining accuracy. Further, when the pressure inside the chamber is extremely low, the atmosphere invades the chamber from the outside and the powder material is oxidized, to deteriorate a strength of the shaped object. However, in that case, such a behavior is prevented from occurring, and the atmosphere is prevented from invading, which makes it possible to prevent deterioration of the strength of the shaped object.

According to another embodiment of the present invention, in the above-mentioned method for manufacturing a three-dimensional shaped object, the lowering speed and the lifting speed of the lifting/lowering frame and the amount of supplying the ambient gas during the discharge of the fumes and the supply of the ambient gas are controlled on the basis of an oxygen concentration inside the chamber.

According to the above constitution, a lowering speed and a lifting speed of the lifting/lowering frame, and an amount of supplying the ambient gas are controlled on the basis of an oxygen concentration inside the chamber, it is possible to prevent the atmosphere from invading, which makes it possible to prevent deterioration of the strength of the shaped object caused by oxidation.

According to another embodiment of the present invention, in the above-mentioned method for manufacturing a three-dimensional shaped object, the discharge of the fumes and the supply of the ambient gas may be carried out during the irradiation with the light beam.

According to the above constitution, since the irradiation with the light beam is carried out during the discharge of the fumes and the supply of the ambient gas, the irradiation with a light beam is not interrupted, which makes it possible to improve the production efficiency.

According to another embodiment of the present invention, in the above-mentioned method for manufacturing a three-dimensional shaped object, it is preferred that a shutter that covers a bottom surface of the window is closed during the discharge of the fumes and the supply of the ambient gas.

According to the above constitution, since the shutter that covers the bottom surface of the window is closed during the discharge of the fumes and the supply of the ambient gas, it is possible to prevent the scattering of the light beam caused by the powder material and the fumes adhering to the window, which makes it possible to improve the positional accuracy of irradiation with the light beam, and the machining accuracy.

Effect of the Invention

According to the present invention, it is possible to provide a method for manufacturing a three-dimensional shaped object, which is capable of easily eliminating fumes inside the chamber, so as to improve a positional accuracy of irradiation with a light beam and a machining accuracy.

BRIEF DESCRIPTION OF THE DRAWINGS

FIGS. 6A to 6C are diagrams showing a relationship between a height from an irradiation plane to a window and a shift of irradiation position in the manufacturing method.

REFERENCE SIGNS LIST

Figure 1:
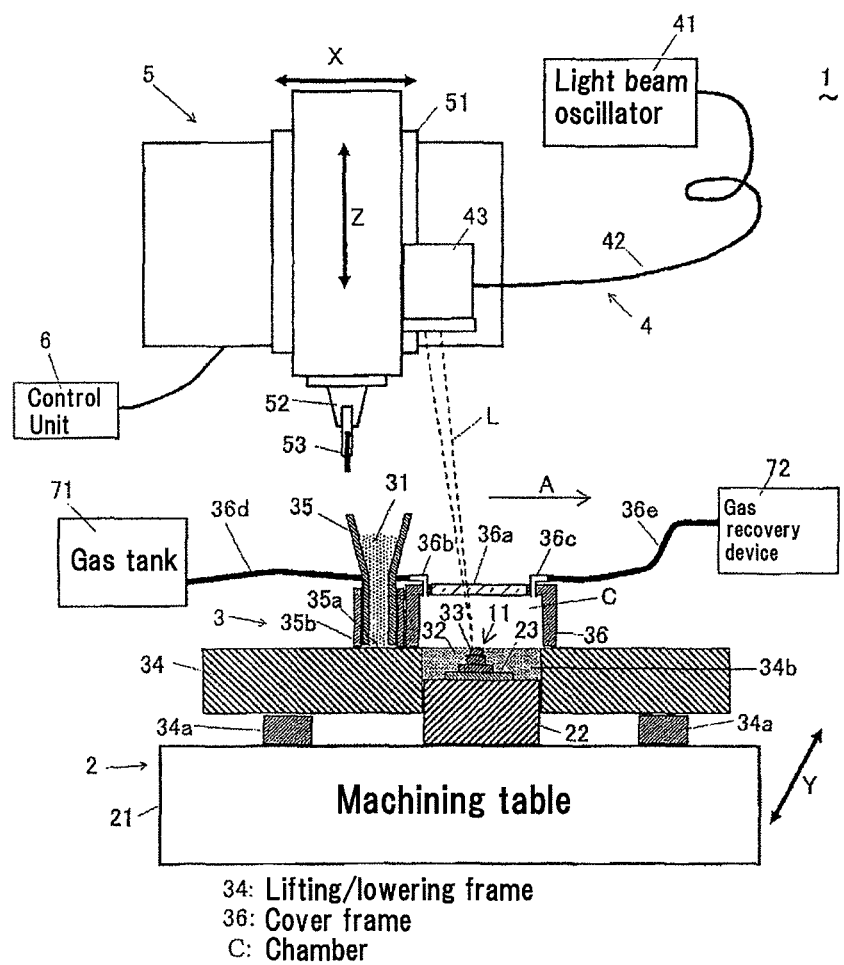
FIG. 1 is a block diagram of a stacked-layers forming device used for a manufacturing method according to an embodiment of the present invention.

1 Stacked-layers forming device
11 Shaped object (three-dimensional shaped object)
22 Base
3 Powder layer forming unit (powder layer forming means)
31 Powder material
32 Powder layer
33 Solidified layer
34 Lifting/lowering frame
34a Lifting/lowering drive unit (lifting/lowering drive means)
34b Penetrating space
36 Cover frame
36a Window
36b Air supply port
36c Exhaust port
37 Shutter
4 Light beam irradiating unit
71 Gas tank (ambient gas supply means)
C Chamber
L Light beam

BEST MODES FOR CARRYING OUT THE INVENTION

A method for manufacturing a three-dimensional shaped object according to an embodiment of the present invention will be described with reference to the accompanying drawings. FIG. 1 shows a constitution of a stacked-layers forming device (hereinafter referred to as the present device) used for the manufacturing method. The present device 1 comprises: a shaping unit 2 that shapes a shaped object 11 having a three-dimensional shape; a powder layer forming unit (powder layer forming means) 3 that supplies a powder material 31 to form a powder layer 32; a light beam irradiating unit 4 that irradiates the powder layer 32 with a light beam L to form a solidified layer 33; a milling and removal tool 5 that performs milling operation in the vicinity of the circumference of the shaped object 11; and a control unit 6 that controls operations of the respective units. The powder layer 32 is irradiated with the light beam L, thereby allowing sintering or melting and subsequent solidification of the powder layer 32 to be the solidified layer 33. Further, the present device 1 comprises a gas tank (ambient gas supply means) 71 that supplies an ambient gas to the powder layer forming unit 3, and a gas recovery device 72 that recovers the ambient gas.

The shaping unit 2 has a machining table 21, a base 22 provided on the machining table 21, and forming plate 23 which is set on the base 22 and on which the powder layer 32 is laid. The powder material 31 is, for example, iron powder having an average grain diameter of 20 µm. The forming plate 23 may be formed of a material similar to the powder material 31, or a material closely adhering to the powder material 31 subjected to melting and subsequent solidification thereof.

The powder layer forming unit 3 comprises: a lifting/lowering frame 34 surrounding the circumference of the base 22; a lifting/lowering drive unit 34a (lifting/lowering drive means) that lifts and lowers the lifting/lowering frame 34; a powder supply unit 35 that retains the powder material 31; and a cover frame 36 which is disposed on the lifting/lowering frame 34 to cover the powder layer 32 so as to form a chamber C. The lifting/lowering frame 34 has a penetrating space 34b which is communicated from one side to the other side and contains the base 22 therein. As a result, the base 22 is accommodated in the penetrating space 34b, and thus the lifting/lowering frame 34 is made capable of being freely lifted and lowered with respect to the base 22. The chamber C is constituted by the top surface of the base 22, the inner circumferential surface, specifying the penetrating space 34b, of the lifting/lowering frame 34, and the inner surface of the cover frame 36. Further, the powder supply unit 35 and the cover frame 36 are adjacently provided.

The top surface of the lifting/lowering frame 34 is a plain surface, and the powder supply unit 35 and the cover frame 36 slide to move in the direction of arrow A (in the direction parallel to the top surface of the lifting/lowering frame 34) on the plain surface. Further, the lifting/lowering frame 34 circumferentially holds the powder layer 32 fed to the base 22. The powder supply unit 35 has a supply port 35a opened downward, and a blade 35b is provided in the direction of the central axis of the powder supply unit 35 on the outer circumference of the supply port 35a. The powder supply unit 35 supplies the powder material 31 from the supply port 35a to the base 22, and evens out the powder material 31 with the blade 35b to form the powder layer 32 while moving on the base 22.

The cover frame 36 has a window 36a which allows transmission of the light beam L in the top surface thereof. The material of the window 36a is, for example, zinc selenide or the like when the light beam L is a carbon dioxide gas laser, and quartz glass or the like when the light beam L is a YAG laser. In addition, any material allowing sufficient transmission of the light beam L may be used. The lower side of the cover frame 36 is opened, and the size of the opening is greater than the area of the top surface of the powder layer 32.

When the powder layer 32 is irradiated with the light beam L, the cover frame 36 moves to a position where the powder layer 32 is covered therewith.

When the cover frame 36 is at a position at which the cover frame 36 covers the powder layer 32, the inside of the chamber C is filled with an ambient gas, which prevents oxidization or the like of the powder material 31. The ambient gas is, for example, a nitrogen gas or an argon gas. Further, a reducing gas may be used in place of the ambient gas. The ambient gas is supplied into the chamber C from an air supply port 36b provided in the cover frame 36, and the ambient gas in the chamber C is discharged from an exhaust port 36c provided in the cover frame 36. The air supply port 36b is connected to the gas tank 71 through a supply piping 36d, and the exhaust port 36c is connected to the gas recovery device 72 through an exhaust piping 36e. Backflow valves for preventing backward flow of the ambient gas may be provided in the air supply port 36b and the exhaust port 36c. Further, the air supply port 36b and the exhaust port 36c may be made into one air supply/exhaust port, and air supply and evacuation may be carried out in a time-splitting manner. Further, the gas recovery device 72 may forcibly aspirate the gas in the chamber C.

The light beam irradiating unit 4 comprises: a light beam oscillator 41 that oscillates the light beam L; an optical fiber 42 for transmitting the light beam L; and an optical instrument 43 that scans the powder layer 32 with the light beam L. The optical instrument 43 has a beam reflex mirror (not shown), a condenser lens (not shown), and a galvanometer mirror (not shown). The light beam oscillator 41 is, for example, an oscillator for carbon dioxide gas laser or YAG laser.

The milling and removal tool 5 is a numerical control machine tool comprising a triaxial-controllable spindle stock 51, and an end mill 53 for machining is set to a spindle head 52 of the spindle stock 51. The end mill 53 is, for example, a twin-bladed type ball end mill made of a superhard material, and a square end mill, a radius end mill, a drill, or the like may be used according to a machining shape and a purpose, which is automatically exchangeable. The spindle head 52 is movable in the X and Z directions (herein, the X direction is the direction parallel to the top surface of the lifting/lowering frame 34, and the Z direction is the direction vertical to the top surface of the lifting/lowering frame 34), and the machining table 21 is movable in the Y direction (herein, the Y direction is the direction perpendicular to both the X direction and Z direction. In FIG. 1, arrow of the Y direction is shown in a perspective view, but is actually the direction perpendicular to the paper plane). The optical instrument 43 is set to the spindle stock 51.

Figure 2:
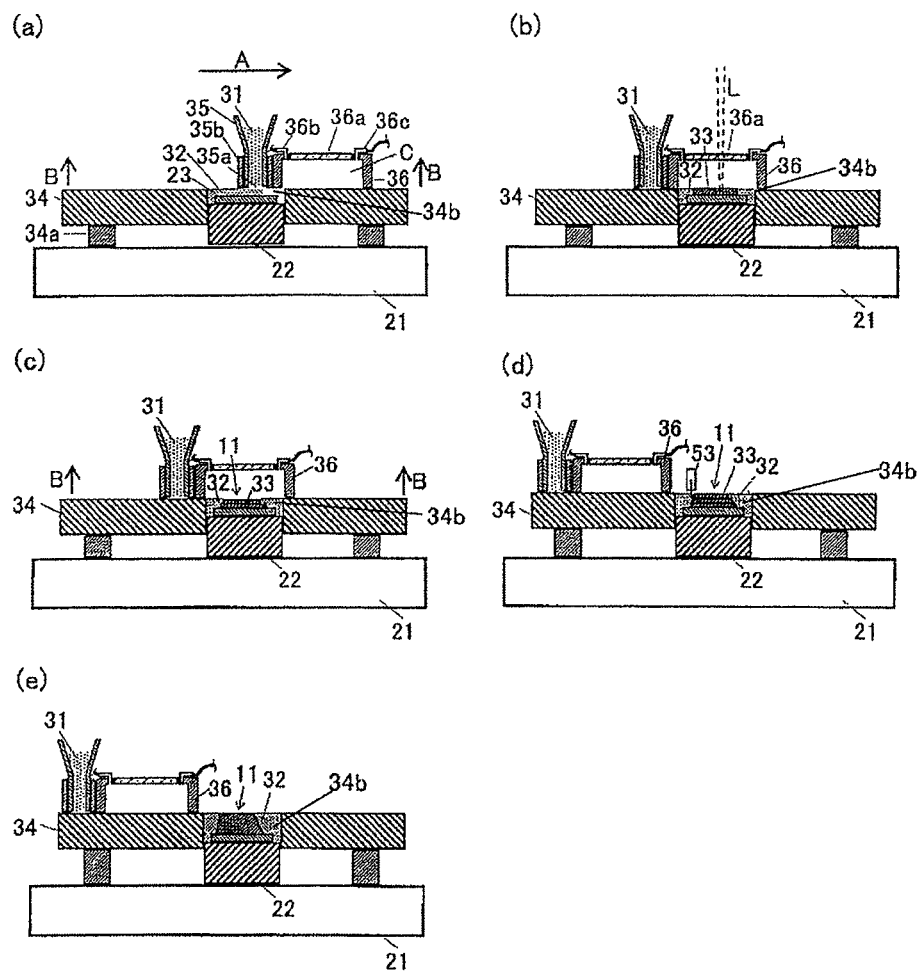
FIGS. 2A to 2E are diagrams showing the manufacturing method in time series.
Figure 3:
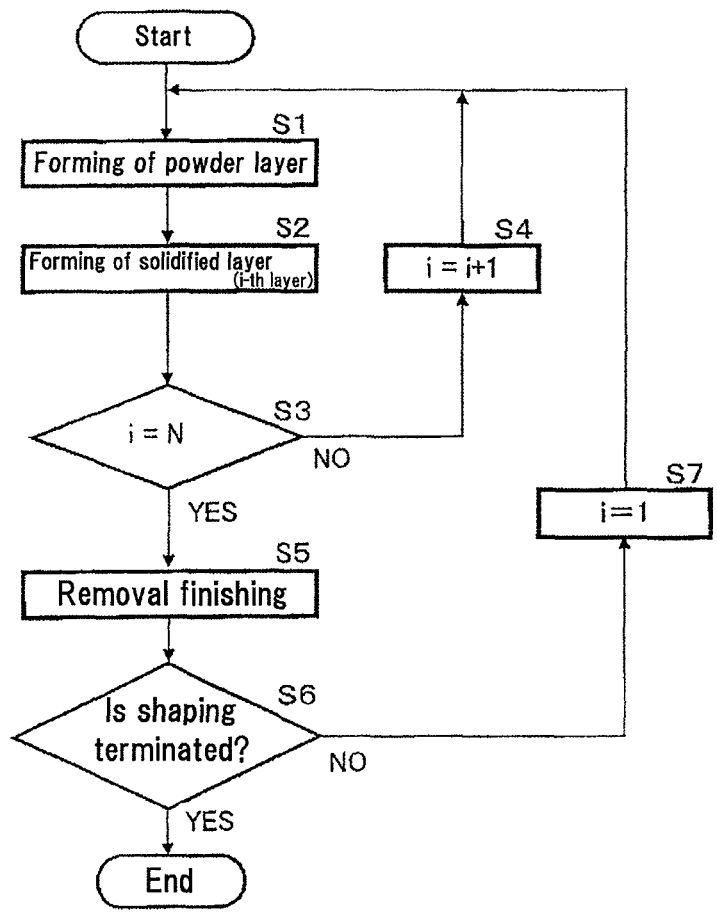
FIG. 3 is a flowchart of the manufacturing method.

FIG. 2 shows operations for manufacturing a three-dimensional shaped object by means of the present device 1, and FIG. 3 shows a flow thereof. As shown in FIG. 2A, the control unit 6 lifts the lifting/lowering frame 34 in the direction of arrow B by a distance of the thickness of the powder layer 32 to be formed from now. Thereafter, the control unit 6 moves the powder supply unit 35 and the cover frame 36 in the direction of arrow A, to supply the powder material 31 onto the forming plate 23 so as to form the powder layer 32. This process is a powder layer forming process, which corresponds to step S1 in FIG. 3. Next, as shown in FIG. 2B, the control unit 6 moves the cover frame 36 to a position where the powder layer 32 is to be covered thereby, and scans an arbitrary portion of the powder layer 32 with the light beam L, thereby allowing sintering or melting and subsequent solidification of the powder material 31, to form the solidified layer 33 stacked on the forming plate 23. This process is a solidified layer forming process, which corresponds to step S2 in FIG. 3.

In this solidified layer forming process, the solidified layer 33 as the i-th layer (i is an integer) is formed. An irradiation path of the light beam L is determined on the basis of the contour shape data of the respective cross-sections, into which STL (Stereo Lithography) data preliminarily produced from a 3-D CAD model are sliced at even pitches of, for example, 0.05 mm. It is preferred that the irradiation path is made high-density in such a manner that at least the uppermost surface of the shaped object 11 has porosity of not more than 5%. Since fumes are generated from the solidified layer 33 by irradiation with the light beam L, a given amount of ambient gas is supplied from the air supply port 36b into the chamber C, and is discharged from the exhaust port 36c in order to eliminate the fumes. However, since an interior volume of the chamber C is small, it is likely that the chamber C is filled with fumes. The light beam L scatters by the fumes inside the chamber C and the fumes adhering to the window 36a, which results in decreased output and decreased degree of focusing of the light beam L, and also results in deterioration in positional accuracy of irradiation with the light beam L and deterioration in machining accuracy. Further, the light beam L is absorbed into the fumes adhering to the window 36a to raise the temperature of the window 36a, which thermally deforms the window 36a to further deteriorate the positional accuracy of irradiation. Therefore, when an amount of the fumes reaches a predetermined amount or more, the fumes are eliminated. An operation for eliminating the fumes will be described in detail with reference to FIG. 5.

The powder layer forming process shown in FIG. 2A (step S1 in FIG. 3) and the solidified layer forming process shown in FIG. 2B (step S2 in FIG. 3) which are described above are repeated, and the lifting/lowering frame 34 is lifted in the direction of arrow B every time the powder layer 32 is newly formed. As a result, the solidified layers 33 are stacked as shown in FIG. 2C. The stacking of the solidified layers 33 is repeated until the number of layers i reaches the number of layers N (steps S1 to S4 in FIG. 3). The number of layers N is determined from an effective cutting length of the end mill 53 that performs milling near the surface of the shaped object 11. For example, if the end mill 53 has a diameter of 1 mm and an effective cutting length of 3 mm, a milling process in a depth of 3 mm can be performed, and when the thickness of the powder layer 32 is 0.05 mm, the number of layers N becomes 50, which corresponds to the thickness of the stacked powder layers of 2.5 mm. Then, when the number of layers i of the solidified layers 33 reaches the number of layers N, the end mill 53 is moved to the circumference of the shaped object 11 as shown in FIG. 2D, and the powder material 31 constituting the powder layer 32 is removed from the surface of the shaped object 11 by the end mill 53. This process is a removal finishing process, which corresponds to step S5 in FIG. 3. This removal finishing process is not mandatory, and may be not necessarily performed. After step S5 in FIG. 3, it is judged whether shaping is terminated (step S6). When the shaping is not terminated, after the number of layers i is initialized to 1 (step S7), and the process returns to step S1 to repeat the above-described processes. In this way, the formation of the solidified layers 33 and the removal finishing of the surface of the shaped object 11 are repeated until the shaping is terminated as shown in FIG. 2E.

Figure 4:
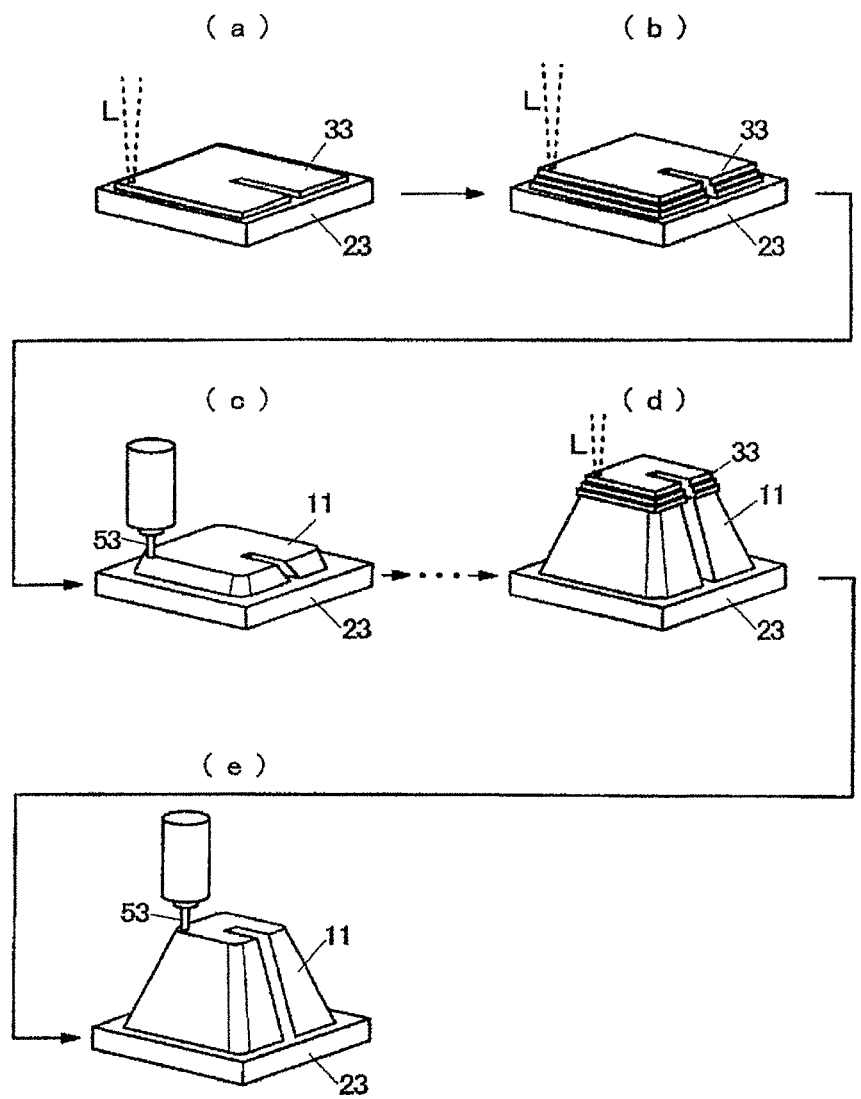
FIG. 4 is diagrams showing a shaped object manufactured by the manufacturing method in time series.

FIG. 4 shows a shaped object which is to be manufactured by the above-mentioned manufacturing method in time series. The solidified layer 33 is formed on the forming plate 23 as shown in FIG. 4A, and the next solidified layer 33 is newly stacked as shown in FIG. 4B. Next, when the number of layers of the solidified layers 33 reaches a predetermined number of layers, the powder material 31 constituting the powder layer 32 is removed from the surface of the shaped object 11 by the end mill 53 as shown in FIG. 4C. The formation of the solidified layers 33 and the surface removal finishing are repeated to form the shaped object 11 as shown in FIG. 4D, and the final surface removal finishing is performed as shown in FIG. 4E, that terminates the manufacturing of the shaped object 11.

Figure 5:
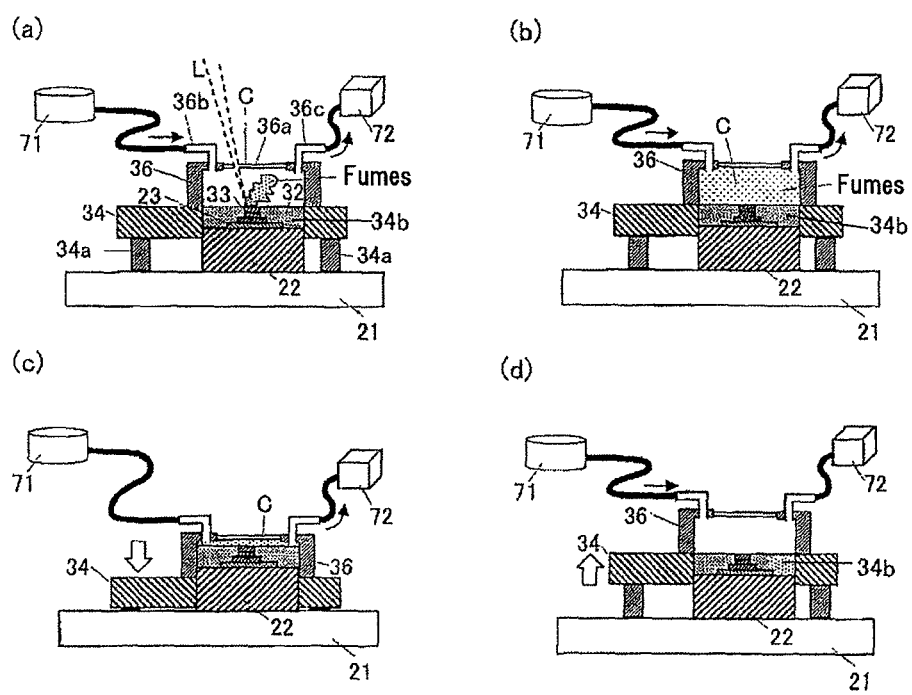
FIGS. 5A to 5D are diagrams showing an operation of evacuating fumes in the manufacturing method in time series.

Next, a fume discharging operation will be described with reference to FIG. 5. As shown in FIG. 5A, fumes are generated when the powder layer 32 is irradiated with the light beam L. At this time, a given amount of an ambient gas is supplied from the gas tank 71 into the chamber C via the air supply port 36b, and the ambient gas inside the chamber C is discharged along with the fumes to the gas recovery device 72 via the exhaust port 36c. A fume sensing unit (not shown) is attached in the cover frame 36, to detect an amount of fumes. The fume sensing unit is, for example, a particle counter or an optical sensor that senses a light volume transmitted through the inside of the chamber C. When an amount of the fumes inside the chamber C reaches a predetermined amount or more as shown in FIG. 5B, the control unit 6 stops the irradiation with the light beam L, and lowers the lifting/lowering frame 34 along with the cover frame 36 in a state where the air supply port 36b is closed and the exhaust port 36c is open, to reduce the volume of the chamber C so as to discharge the fumes inside the chamber C as shown in FIG. 5C. When an amount of the fumes is decreased to a predetermined amount or less as shown in FIG. 5D, the control unit lifts the lifting/lowering frame 34 in a state where the exhaust port 36c is closed and the air supply port 36b is open, to fill the inside of the chamber C with an ambient gas, and again starts irradiation with the light beam L.

According to the manufacturing method of the present embodiment, the lifting/lowering frame 34 is lowered to reduce the volume of the chamber C, which makes it possible to smoothly perform discharging air. Since the volume of the chamber C is reduced, replacement of the fumes with the ambient gas is smoothly carried out, which makes it possible to easily eliminate the fumes. Therefore, it is possible to prevent the scattering of light beam L caused by the fumes inside the chamber C or the fumes adhering to the window 36a, which makes it possible to suppress decreased output and decreased degree of focusing of the light beam L. Further, it is possible to suppress a thermal deformation of the window 36a caused by the fact that the light beam L is absorbed in the fumes on the surface of the window 36a, thereby improving the positional accuracy of irradiation, and the machining accuracy.

Further, irradiation with the light beam L may be carried out even during the fume discharging operation. During the fume discharging operation, a height from the irradiation plane to the window 36a changes. However, it will be described with reference to FIG. 6 that the irradiation position of the light beam L does not fluctuate due to a change of the height. As shown in FIG. 6A, since the light beam L is refracted by the window 36a, the irradiation position is shifted from the irradiation position in a case where the light beam L is not refracted, but goes straight. The control for the irradiation position of the light beam L is determined in advance in consideration of this shift. A distance W of this shift is determined on the basis of an incident angle θ of the light beam L and a thickness t of the window 36a. Therefore, the distance W of this shift is the same both in a case where the height from the irradiation plane to the window 36a is high as shown in FIG. 6B and in a case where the height from the irradiation plane to the window 36a is low as shown in FIG. 6C. Accordingly, since the irradiation position does not fluctuate even when the height from the irradiation plane to the window 36a changes, it is possible to carry out irradiation with the light beam L even during the fume discharging operation. In this way, since irradiation with the light beam L is carried out even during the fume discharging operation, the production efficiency is improved.

In a case where irradiation with the light beam L is carried out during the fume discharging operation, it is possible to discharge the fumes immediately after fumes are generated. Therefore, it is possible to suppress a rise in a fume concentration inside the chamber C.

Next, a first modified example of the present embodiment will be described. The present device 1 used for the modified example has a timer (not shown) in place of the fume sensing unit, and an discharging operation is carried out on the basis of a time measured by the timer. When a time from the start of irradiation with the light beam L reaches a predetermined time, the control unit lowers the lifting/lowering frame 34 to discharge the fumes inside the chamber C, and when the time reaches another predetermined time, the control unit lifts the lifting/lowering frame 34 to fill the inside of the chamber C with an ambient gas. In the same manner as in the first embodiment, since discharge of the fumes is smoothly carried out, and replacement of the fumes with the ambient gas is smoothly carried out, the positional accuracy of irradiation with the light beam and the machining accuracy are improved. Further, the timer is used, which results in low cost.

Next, a second modified example of the present embodiment will be described. The present device 1 used for the modified example has a pressure sensor (not shown) that detects a pressure inside the chamber C in addition to the constitution in the first embodiment. The pressure inside the chamber C fluctuates according to lowering and lifting of the lifting/lowering frame 34. However, in a case of a high fluctuation, a flow of the air inside the chamber C is made turbulent, and thus the powder material 31 scatters to adhere to the window 36a, which may result in decreased output of the light beam L. Further, when the pressure is low, it is likely that the atmosphere can invade the chamber from the outside. When the atmosphere invades the chamber from the outside, the powder material 31 is oxidized to deteriorate the strength of the shaped object 11, and an amount of generated fumes is increased. Accordingly, a lowering speed and a lifting speed of the lifting/lowering frame 34, and an amount of supplying the ambient gas are controlled such that the pressure inside the chamber C becomes a predetermined value. When the pressure during lowering the lifting/lowering frame 34 is high, the lowering speed is slowed down, or the amount of supplying the ambient gas is decreased. Further, the pressure may be forcibly aspirated by the gas recovery device 72. In contrast, when the pressure is low, the lowering speed is increased, or the amount of supplying the ambient gas is increased. When the pressure during lifting the lifting/lowering frame 34 is high, the lifting speed is increased, or the amount of supplying the ambient gas is decreased. Further, the pressure may be forcibly aspirated by the gas recovery device 72. In contrast, when the pressure is low, the lifting speed is slowed down, or the amount of supplying the ambient gas is increased. An adjustment for the pressure inside the chamber C may be carried out by any one of methods for adjusting the lowering speed and the lifting speed of the lifting/lowering frame 34, the amount of supplying the ambient gas, and the amount of aspiration by the gas recovery device 72, or may be carried out by combining the plurality of adjusting methods.

In this way, according to the manufacturing method of the present modified example, the pressure inside the chamber C during lowering and lifting the lifting/lowering frame 34 is controlled to be a predetermined value, scattering of the powder material 31 is suppressed, which improves the positional accuracy of irradiation with the light beam L and the machining accuracy. Further, invasion of the atmosphere is suppressed, that prevents deterioration of the strength of the shaped object 11.

Next, a third modified example of the present embodiment will be described. The present device 1 used for the modified example has an oxygen sensor (not shown) in the cover frame 36 in addition to the constitution of the first embodiment, and the oxygen sensor detects oxygen in the atmosphere invading the chamber C from a gap between the cover frame 36 and the lifting/lowering frame 34. When the atmosphere invades the chamber C, the powder material 31 is oxidized to deteriorate the strength of the shaped object 11, and an amount of generated fumes is increased. Accordingly, when an oxygen concentration during lowering the lifting/lowering frame 34 is high, the control unit 6 speeds up the lowering speed or increases the amount of supplying the ambient gas to prevent invasion of the atmosphere. When the oxygen concentration when lifting the lifting/lowering frame 34 is high, the control unit 6 slows down the lifting speed or increases the amount of supplying the ambient gas.

In this way, according to the manufacturing method of the present modified example, invasion of the atmosphere into the chamber C when lowering and lifting the lifting/lowering frame 34 is prevented. Therefore, oxidization of the powder material 31 is prevented, that prevents deterioration of the strength of the shaped object 11.

Figure 7:
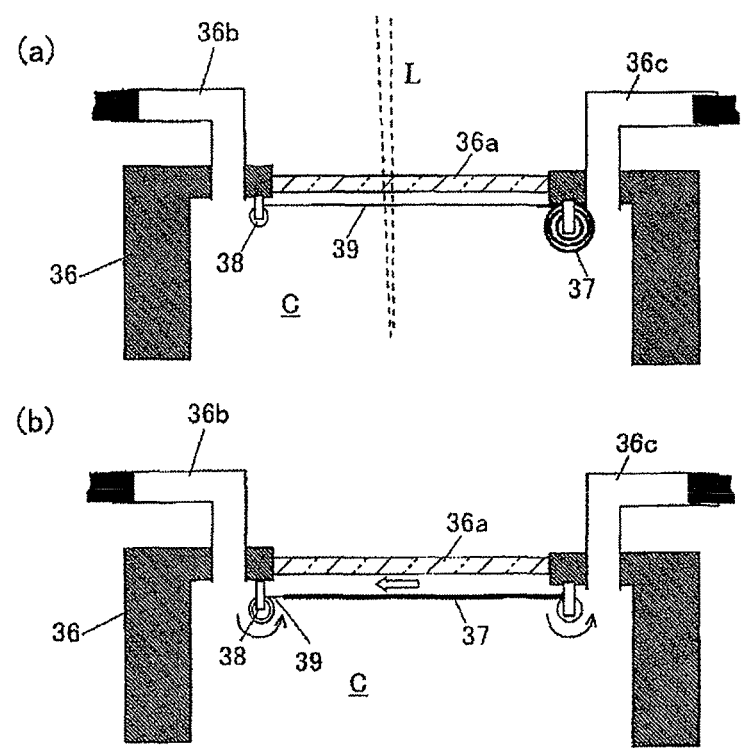
FIGS. 7A and 7B are block diagrams of a cover frame of the stacked-layers forming device used for a manufacturing method according to a modified example of the present embodiment.

A fourth modified example of the present invention will be described with reference to FIG. 7. As shown in FIG. 7A, the present device 1 used for the modified example has a shutter 37 that prevents the powder material 31 or fumes from adhering to the window 36a. The shutter 37 is a flexible noncombustible material, which is, for example, a metal sheet. The shutter 37 is wound in a roll, and is disposed at a position, adjacent to one end side of the bottom surface of the window 36a, of the inner face of the cover frame 36. A roller 38 and a motor (not shown) that drives the roller 38 are provided at positions adjacent to the other end side of the bottom surface of the window 36a, and the roller 38 and the end of the winding-off portion of the shutter 37 are connected with, for example, a metal leading line 39. The leading line 39 is provided at a position where the irradiation with the light beam L is not interrupted. A flow of the air inside the chamber C is made turbulent due to lowing and lifting of the lifting/lowering frame 34 during the fume discharging operation, and thus the powder material 31 and the fumes are scattered to adhere to the window 36a, which results in decreased output of the light beam L. Therefore, closing the shutter 37 prevents the adherence.

During lowering and lifting of the lifting/lowering frame, the motor is driven to wind up the leading line 39 onto the roller, to close the shutter 37 as shown in FIG. 7B. Since the bottom surface of the window 36a is covered with the shutter 37, scattering of the light beam L caused by the powder material 31 and the fumes adhering to the window 36a is prevented, which improves the positional accuracy of irradiation with the light beam, and the machining accuracy.

In addition, the present invention is not limited to the aforementioned various embodiments, and it is possible to make various modifications within a range which does not deviate from the gist of the present invention. For example, the stacked-layers forming device may not have a milling and removal tool, and not necessarily perform the surface removal of the shaped object. In this case, a lifting and lowering device that moves an optical device up and down so as to uniform the height from the powder layer may be provided.

In addition, it should be understood that the present invention includes the following aspects.

First aspect: A stacked-layers forming device for manufacturing a three-dimensional shaped object by forming a powder layer, and subsequently forming a solidified layer by irradiating the powder layer with a light beam in a chamber, the stacked-layers forming device comprising:

a base; a lifting/lowering frame having a penetrating space, the penetrating space being communicated from one side to the other side and accommodating the base from the one side, the lifting/lowering frame being freely capable of being lifted and lowered with respect to the base; a cover frame, the cover frame being disposed so as to cover the penetrating space on the lifting/lowering frame, and comprising a window allowing transmission of light beam in its top surface; an ambient gas supply means for supplying an ambient gas; a light beam irradiating unit, the light beam irradiating unit performing irradiation with a light beam via the window; and a control unit, the control unit controlling lifting and lowering of the lifting/lowering frame with respect to the base, wherein the chamber is constituted by a top surface of the base, an inner circumferential surface, specifying the penetrating space, of the lifting/lowering frame, and an inner surface of the cover frame, and the control unit reduces a volume of the chamber by lowering the lifting/lowering frame to discharge fumes generated in the chamber, and increases the volume of the chamber by lifting the lifting/lowering frame to supply an ambient gas from the ambient gas supply means.

Second aspect: The stacked-layers forming device according to the first aspect, further comprising an exhaust port and an air supply port, the exhaust port and the air supply port being communicated with the chamber.

Third aspect: The stacked-layers forming device according to the first aspect or the second aspect, wherein the discharge of the fumes and the supply of the ambient gas are controlled on the basis of an amount of the fumes inside the chamber.

Fourth aspect: The stacked-layers forming device according to the first aspect or the second aspect, wherein the discharge of the fumes and the supply of the ambient gas are carried out on the basis of a time from a start of irradiation with the light beam.

Fifth aspect: The stacked-layers forming device according to any one of the first to fourth aspects, wherein a lowering speed and a lifting speed of the lifting/lowering frame and an amount of supplying the ambient gas during the discharge of the fumes and the supply of the ambient gas are controlled on the basis of a pressure inside the chamber.

Sixth aspect: The stacked-layers forming device according to any one of the first to fourth aspects, wherein a lowering speed and a lifting speed of the lifting/lowering frame and the amount of supplying the ambient gas during the discharge of the fumes and the supply of the ambient gas are controlled on the basis of an oxygen concentration inside the chamber.

Seventh aspect: The stacked-layers forming device according to any one of the first to sixth aspects, wherein the discharge of the fumes and the supply of the ambient gas are carried out during the irradiation with the light beam.

Eighth aspect: The stacked-layers forming device according to any one of the first to seventh aspects, further comprising a shutter covering a bottom surface of the window.

Ninth aspect: A method for manufacturing a three-dimensional shaped object, the method producing a three-dimensional shaped object by using a stacked-layers forming device that successively stacks some solidified layers by repeating a powder layer forming step of supplying an inorganic or organic powder material to form a powder layer, and a solidified layer forming step of forming a solidified layer by irradiating the powder layer with a light beam, thereby allowing sintering or melting and subsequent solidification of the powder layer, wherein the stacked-layers forming device comprising: a powder layer forming means for executing the powder layer forming step; a light beam irradiating unit for irradiating the powder layer with the light beam; a base, the base being fixed and on a top surface side of the base the powder layer and the solidified layer being formed, a lifting/lowering frame, the lifting/lowering frame surrounding an outer circumference of the base and being freely capable of being lifted and lowered with respect to the base; a lifting/lowering drive means for lifting and lowering the lifting/lowering frame; a cover frame, the cover frame comprising a window allowing transmission of light beam in its top surface, and a bottom surface of the cover frame being opened, and the cover frame being disposed on the lifting/lowering frame to form a chamber; and ambient gas supply means for supplying an ambient gas into the cover frame, wherein a volume of the chamber is reduced by lowering the lifting/lowering frame to discharge fumes generated inside the cover frame, and the volume of the chamber is increased by lifting the lifting/lowering frame to supply an ambient gas from the ambient gas supply means.

Tenth aspect: The method for manufacturing a three-dimensional shaped object according to the ninth aspect, wherein the discharge of the fumes and the supply of the ambient gas are carried out respectively via an exhaust port and an air supply port, the exhaust port and the air supply port being provided in the cover frame.

Eleventh aspect: The method for manufacturing a three-dimensional shaped object according to the ninth aspect or the tenth aspect, wherein the discharge of the fumes and the supply of the ambient gas are controlled on the basis of an amount of the fumes inside the chamber.

Twelfth aspect: The method for manufacturing a three-dimensional shaped object according to the ninth aspect or the tenth aspect, wherein the discharge of the fumes and the supply of the ambient gas are carried out on the basis of a time from a start of irradiation with the light beam.

Thirteenth aspect: The method for manufacturing a three-dimensional shaped object according to any one of the ninth to twelfth aspects, wherein a lowering speed and a lifting speed of the lifting/lowering frame and an amount of supplying the ambient gas during the discharge of the fumes and the supply of the ambient gas are controlled on the basis of a pressure inside the chamber.

Fourteenth aspect: The method for manufacturing a three-dimensional shaped object according to any one of the ninth to thirteenth aspects, wherein the lowering speed and the lifting speed of the lifting/lowering frame and the amount of supplying the ambient gas during the discharge of the fumes and the supply of the ambient gas are controlled on the basis of an oxygen concentration inside the chamber.

Fifteenth aspect: The method for manufacturing a three-dimensional shaped object according to any one of the ninth to fourteenth aspects, wherein the discharge of the fumes and the supply of the ambient gas are carried out during the irradiation with the light beam.

Sixteenth aspect: The method for manufacturing a three-dimensional shaped object according to any one of the ninth to fifteenth aspects, wherein a shutter that covers a bottom surface of the window is closed during the discharge of the fumes and the supply of the ambient gas.

CROSS-REFERENCE TO RELATED APPLICATIONS

This application claims priority under the Paris Convention based on JP-A-2009-119021 (filed on May 15, 2009, TITLE OF THE INVENTION: "METHOD FOR MANUFACTURING THREE-DIMENSIONAL SHAPED OBJECT"), the entire contents of which are incorporated herein by reference.

The invention claimed is:

1. A method for manufacturing a three-dimensional shaped object, the method producing a three-dimensional shaped object by using a stacked-layers forming device that successively stacks solidified layers by repeating a powder layer forming by supplying an inorganic or organic powder material to form a powder layer, and forming a solidified layer by irradiating the powder layer with a light beam, thereby sintering or melting and subsequently solidifying the powder layer, wherein the method, comprising:
  forming, by a powder layer former, the powder layer forming step;
  irradiating, by a light beam irradiator, the powder layer with a light beam;
  providing, a base, the base being fixed, the powder layer and the solidified layer being formed on a top surface side of the base;
  providing a lifting/lowering frame, the lifting/lowering frame surrounding an outer periphery of the base and being configured to be lifted and lowered with respect to the base;
  providing a lifting/lowering driver for lifting and lowering the lifting/lowering frame;
  a cover frame, the cover frame comprising a window in a top surface of the cover frame, the window allowing transmission of the light beam, a bottom surface of the cover frame being open, and the cover frame being disposed on the lifting/lowering frame to form a chamber;
  supplying an ambient gas into the cover frame, discharging fumes generated inside the cover frame by reducing a volume of the chamber by lowering the lifting/lowering frame, and
supplying an ambient gas to the cover frame by increasing the volume of the chamber by lifting the lifting/lowering frame.

2. The method for manufacturing a three-dimensional shaped object according to claim 1, wherein the discharging of the fumes and the supplying of the ambient gas are carried out via an exhaust port and gas supply port, the exhaust port and the gas supply port being provided in the cover frame.

3. The method for manufacturing a three-dimensional shaped object according to claim 1, wherein the discharging of the fumes and the supplying of the ambient gas are controlled based on an amount of the fumes inside the chamber.

4. The method for manufacturing a three-dimensional shaped object according to claim 1, wherein the discharging of the fumes and the supplying of the ambient gas are performed based on a time from a start of the irradiating with the light beam.

5. The method for manufacturing a three-dimensional shaped object according to claim 1, further comprising controlling a lowering speed and a lifting speed of the lifting/lowering frame, an amount of ambient gas supplied during the discharge of the fumes and a supply of the ambient gas, based on a pressure inside the chamber.

6. The method for manufacturing a three-dimensional shaped object according to claim 1, further comprising controlling a lowering speed and the lifting speed of the lifting/lowering frame, an amount of ambient gas supplied during the discharge of the fumes and a supply of the ambient gas based on an oxygen concentration inside the chamber.

7. The method for manufacturing a three-dimensional shaped object according to claim 1, wherein discharging of the fumes and supplying of the ambient gas are performed during the irradiating with the light beam.

8. The method for manufacturing a three-dimensional shaped object according to claim 1, further comprising closing a shutter that covers a bottom surface of the window during discharging of the fumes and supplying of the ambient gas.

9. The method for manufacturing a three-dimensional shaped object according to claim 2, further comprising, providing the exhaust port and the supply port at the top surface of the cover frame.

10. The method for manufacturing a three-dimensional shaped object according to claim 1, wherein the lifting of the lifting/lowering frame to supply the ambient gas is performed while an exhaust port is closed and the ambient gas supply is open, and lowering of the lifting/lowering frame to discharge the fumes is performed while the ambient gas supply is closed and the exhaust port is open.

11. The method for manufacturing a three-dimensional shaped object according to claim 1, wherein a speed of the lifting and lowering of the lifting/lowering frame is variable.

12. The method for manufacturing a three-dimensional shaped object according to claim 8, further comprising providing a motor to move the shutter to cover a bottom surface of the window.

* * * * *